United States Patent

Martell et al.

[11] Patent Number: 5,813,037
[45] Date of Patent: Sep. 22, 1998

[54] MULTI-PORT REGISTER FILE FOR A RESERVATION STATION INCLUDING A PAIR OF INTERLEAVED STORAGE CELLS WITH SHARED WRITE DATA LINES AND A CAPACITANCE ISOLATION MECHANISM

[75] Inventors: Robert W. Martell, Hillsboro; Alexander P. Henstrom, Beaverton, both of Oreg.

[73] Assignee: Intel Corporation, Santa Clara, Calif.

[21] Appl. No.: 413,962

[22] Filed: Mar. 30, 1995

[51] Int. Cl.[6] ............................. G06F 12/00; G06F 13/00
[52] U.S. Cl. ........................ 711/147; 711/149; 711/157; 711/393
[58] Field of Search ................................ 395/476, 474, 395/475, 458, 800, 484, 393; 365/230.05; 711/149, 147, 148, 131, 157, 127

[56] References Cited

U.S. PATENT DOCUMENTS

| | | | |
|---|---|---|---|
| 4,933,909 | 6/1990 | Cushing et al. | 365/230.05 |
| 5,129,067 | 7/1992 | Johnson | 395/389 |
| 5,189,640 | 2/1993 | Huard | 365/154 |
| 5,260,908 | 11/1993 | Ueno | 365/230.05 |
| 5,309,395 | 5/1994 | Dickinson et al. | 365/189.04 |
| 5,375,089 | 12/1994 | Lo | 365/230.05 |
| 5,463,745 | 10/1995 | Vidwans et al. | 395/394 |
| 5,467,476 | 11/1995 | Kawasaki | 395/800.23 |
| 5,477,489 | 12/1995 | Wiedmann | 365/230.05 |
| 5,481,495 | 1/1996 | Henkels et al. | 365/230.05 |
| 5,499,352 | 3/1996 | Chift et al. | 395/393 |
| 5,519,864 | 5/1996 | Martell et al. | 395/391 |
| 5,524,263 | 6/1996 | Griffith et al. | 395/800.23 |
| 5,526,497 | 6/1996 | Zilka et al. | 395/310 |

OTHER PUBLICATIONS

"The Metaflow Architecture", Val Popescu, et al., IEEE Micro, Jun. 1991, pp. 10–13 & 63–73.
"Superscalar Microprocessor Design", Mike Johnson, Prentice Hall Series in Innovative Technology, Prentice–Hall, 1991, pp. 1–287.

*Primary Examiner*—Glenn Gossage
*Attorney, Agent, or Firm*—Blakely, Sokoloff, Taylor & Zafman

[57] ABSTRACT

A multi-port register file suitable for use in a reservation station in a superscalar microprocessor. The multi-port register is a static random access memory (SRAM) array which interleaves the data bits of the reservation station entries in a pair of storage cells. Because data may be associatively written to multiple entries within the SRAM cell array, a capacitance isolation mechanism including a plurality of inverters may be provided in data lines, such as writeback data lines, of the array. The isolation mechanism is situated so as to be shared by two interleaved cells within the SRAM array. The storage cells within the reservation station register may include at least one read port and a plurality of write or writeback ports coupled to a plurality of read enable and write enable lines. In one embodiment, cells of the SRAM array are exclusively read and thus a reduced sized sampling transistor may be used for the read ports. Power saving techniques are described for reducing the power consumption of the reservation station SRAM array which include delaying the activation of write enable lines and a preference for reading low power states to prevent the need for excessive precharging of bit lines of the SRAM array.

16 Claims, 10 Drawing Sheets

| ENTRY | BIT 0 | | BIT 1 | | ••• | BIT n | |
|---|---|---|---|---|---|---|---|
| 1 | S1 | S2 | S1 | S2 | | S1 | S2 |
| 2 | S1 | S2 | S1 | S2 | | S1 | S2 |
| ⋮ | | | | | ••• | | |
| N | | | | | | | |

MULTI-PORT REGISTER FILE FOR A RESERVATION STATION INCLUDING A PAIR OF INTERLEAVED STORAGE CELLS WITH SHARED WRITE DATA LINES AND A CAPACITANCE ISOLATION MECHANISM

The present invention is related to co-pending U.S. Pat. application Ser. No. 08/174,715, now abandoned, entitled "A Multi-Port Register" which is assigned to the assignee of the present invention and is fully incorporated herein by reference.

BACKGROUND OF THE INVENTION

1. Field of the Invention

The present invention relates to data storage in data processing systems. More particularly, the present invention relates to a multi-port register for use in a complex microprocessor.

2. Art Background

In general, data processing systems employ registers to store data. The registers are constructed in a variety of ways depending upon the application for the data processing system. For example, a data processing system utilizing a register for latching data on a bus may only require one read and one write port. In more complex data processing systems, applications may require more complex registers having multiple read and/or write ports.

Microprocessors utilize registers to implement file registers for use in conjunction with executing instructions. The file registers store data subsequent to execution by an execution unit in the microprocessor. The complexity of the register file required for operation of the microprocessor is dependent upon the architecture of the microprocessor. For example, in a superscalar microprocessor, some instructions are executed in parallel which increases the need for access to the register file. Consequently, a register file for use in operation of a complex superscalar microprocessor may require multiple ports.

In a superscalar microprocessor which implements a reservation station for buffering operands prior to their dispatch to a functional unit for execution, it may be desirable to simultaneously write a source operand into the reservation station at multiple locations. The act of simultaneously writing multiple locations may introduce large capacitances within the writing circuitry of the register file, particularly one implementing static random access memory (SRAM) cells. This increases the complexity of the circuitry necessary for driving signals into the array. Another concern of implementing register arrays in a microprocessor is the amount of area required on the semiconductor die and the amount of power that the array will consume when accessed. It would be advantageous, and is therefore an object of the present invention, to provide a multi-port register which provides for the isolation of the SRAM capacitances when being associatively written, and further efficiently organizes the memory cells in a low power consuming manner for access.

SUMMARY OF THE INVENTION

From the foregoing, it can be appreciated that it is desirable to improve upon register file designs for implementation of a reservation station register file, for example, in complex microprocessors. It is therefore an object of the present invention to provide a multi-port register design suitable for use in a complex microprocessor which isolates capacitances introduced when associatively writing multiple entries within the register file. It is also an object of the present invention to introduce a register file arrangement which minimizes the die array required for implementing the register file. Another object of the present invention is to minimize the power consumed when writing entries within the reservation station register file.

These and other objects of the present invention are realized in a register file cell arrangement suitable for use in a reservation station wherein bits of multiple source operands are interleaved within the register cell array. Each memory cell is capable of storing a data bit value in two states and having at least one read port and one write port. The source operand bits of the reservation station may be written to from multiple sources at any time and several may be written simultaneously. For example, a reorder buffer may have stored therein a value which needs to be supplied to a cell within the reservation station data array. Further, the reservation station may be implemented to receive source operands through multiple writeback paths from multiple functional units in the processor. Data being supplied to the reservation station over a writeback path may be destined for multiple cells within the array. Accordingly, the array is implemented such that an associative write is enabled which allows for simultaneous writing to multiple cells in the array.

An associative write to multiple cells in the reservation station register file can introduce large capacitances which, if not isolated, can be difficult to overcome quickly for the data write driving circuitry. The present invention thus introduces an isolation mechanism for isolating the capacitance associated with an associative write. In one embodiment of the present invention, the isolating mechanism comprises inverters introduced in writeback data lines coupled to the interleaved SRAM cells. Because the bit cells for the two source operands are interleaved, coincident bits of data from the two source operands may share the isolating mechanism for writeback lines to the array.

In an implemented embodiment of the present invention, a reservation station will only be read from one port at a time because a reservation station entry will only be dispatched to a single execution unit. Thus, the sampling transistor per SRAM cell may be of a reduced size since reads from the cell are exclusive. This decreases the amount of power necessary for reading entries from the SRAM array. Another power saving aspect of the present invention concerns the timing for which power is supplied to the write enable lines during the write stage to the reservation station multi-port register array. An enable signal is not provided immediately at the start of the phase of the write cycle for the array, but rather is delayed to allow some settling time for the data signal. This reduces the amount of power consumed by the register array since the data is not latched until after it has settled. An additional power saving aspect of the present invention concerns orienting bit line polarities such that there is a preference for reading data in a low power state. This reduces the number of times it is necessary to precharge cells after reading.

The multi-port register cell of the present invention has application for use in a superscalar microprocessor performing out-of-order execution and speculative execution. The microprocessor contains instruction fetch and decoder circuits for issuing and decoding instructions, respectively, in the program order. The microprocessor also includes a superscalar execution cluster, containing a plurality of execution units and an out-of-order cluster for performing out-of-order dispatch. The out-of-order cluster contains the reservation station configured in accordance with the multi-port register of the present invention.

The reservation station buffers micro operations and source operands for execution in the superscalar execution units. The described embodiment of the reservation station contains a plurality of write ports to allow simultaneous writing of multiple source operands to various locations in the reservation station. In the implemented embodiment, a single sampling transistor for the read ports is provided because in the superscalar microprocessor of the present invention, a reservation station entry will only be dispatched to a single functional unit for execution. Upon completion of execution of an operation, results from the execution units are written into a reorder buffer and may be simultaneously written back to multiple entries within the reservation station. Further, results stored in the reorder buffer may, at various times, be written to the reservation station.

BRIEF DESCRIPTION OF THE DRAWINGS

The objects, features and advantages of the present invention will be apparent from the following detailed description in which.

DETAILED DESCRIPTION OF THE INVENTION

The present invention provides a method and apparatus for an efficient multi-port register cell arrangement. In the following detailed description, numerous specific details are set forth such as particular execution unit names and specified processor types in order to provide a thorough understanding of the present invention. It will be appreciated, however, by one skilled in the art that the multi-port register of present invention may be practiced in numerous different applications where such advantages provided by the present invention are desired. In other instances, well-known control structures and gate level circuits have not been shown in detail in order not to obscure important aspects of the present invention.

Figure 1:
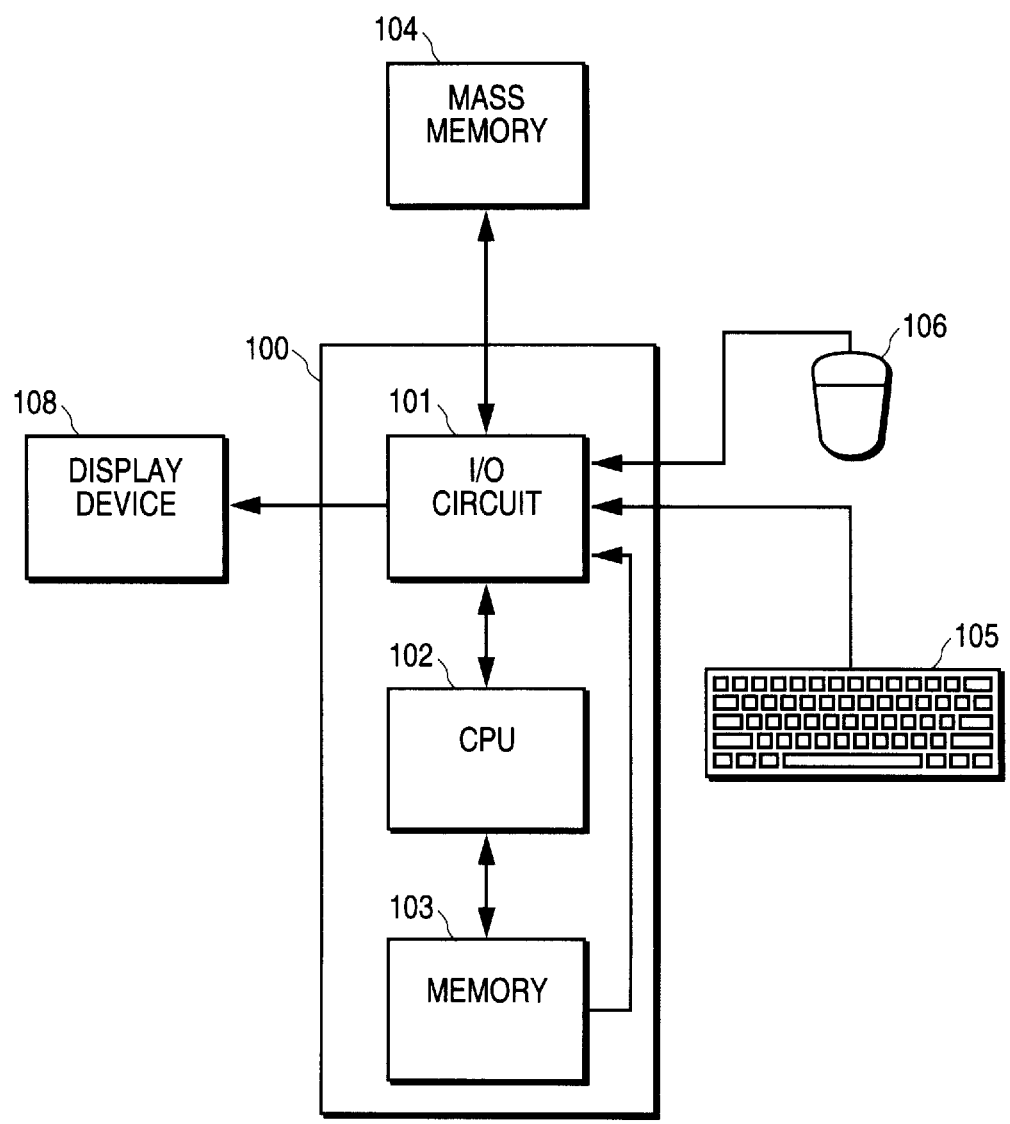
FIG. 1 illustrates a basic computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. It should be understood, however, that the input device may actually be in any other well-known input device (including, of course, another computer). A mass memory device 104 is coupled to I/O circuit 101 and provides additional storage capabilities for the computer 100. The mass memory may store other programs and may take the form of a magnetic or optical disc drive or any other well-known device. It will be appreciated that the data retained within mass memory 104, may, in appropriate cases, be incorporated in standard fashion into computer 100 as part of memory 103.

In addition, a typical computer display device is illustrated, the display monitor 108. Other output devices are well known. Each can be used to display images or documents or other data utilized by the computer 100. A cursor control device 106, such as a mouse, trackball or stylus, is also coupled to I/O circuit 101. Other pointing devices may suitably be used as appropriate.

The present invention may be implemented in any microprocessor architecture in which it is desirable to implement an advantageous multi-port register. A variety of microprocessors may take advantage of the present invention whether those microprocessors occupy a single chip or more than one, and regardless of the materials used to fabricate the chip including silicon or gallium arsenide.

Figure 2:
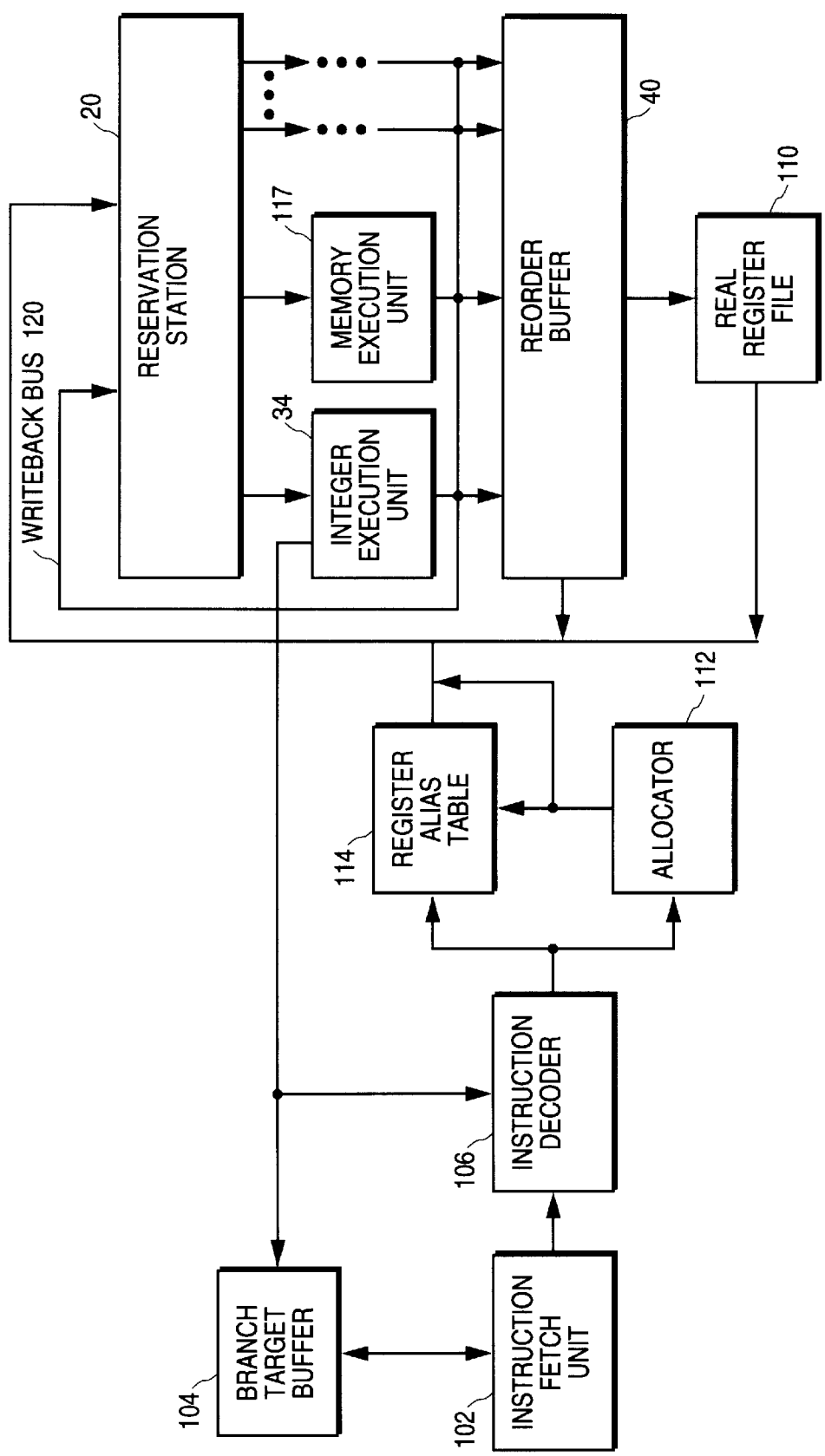
FIG. 2 is a block diagram illustrating a portion of a microprocessor incorporating the present invention.

FIG. 2 is a block diagram of one embodiment of a speculative out-of-order microprocessor which may incorporate the multi-port register of the present invention. The processor comprises an instruction fetch unit (IFU) 102 coupled to a branch target buffer (BTB) 104 and an instruction decoder (ID) 106. Based upon the instruction pointer (IP) provided by the branch target buffer (BTB) 104 to the instruction fetch unit (IFU) 102, the instruction fetch unit (IFU) 102 fetches a macro instruction found at the address in memory (not shown) that is indicated by the IP. The instruction is decoded into one or more micro operations by the instruction decoder 106. The instruction decoder 106 transfers the stream of micro operations to a register alias table (RAT) 114 and an allocator (ALLOC) 112.

The allocator 112 assigns each incoming micro operation to a location in the reorder buffer (ROB) 40, thereby mapping the logical destination address (LDST) of the micro operation to a corresponding physical destination address (PDST) in the ROB. The register alias table (RAT) 114 maintains this mapping.

The contents of a ROB register are retired to a location in a real register file real register file (RRF) 110. The RAT 114 thus also stores a real register file valid bit (RRFV) that indicates whether the value indicated by the logical address is to be found at the physical address in the recorder buffer (ROB) or in the RRF after retirement. Based upon this mapping, the register alias table (RAT) 114 also associates every logical source address to a corresponding location in the ROB or the RRF (the source operand of one instruction generally must have been the destination of a previous instruction).

Each incoming micro operation is also assigned and written into an entry in the reservation station 20 by the allocator 112. The reservation station (RS) 20 assembles the micro operations awaiting execution by an appropriate execution unit, such as integer execution unit (IEU) 34 or memory execution unit (MEM EU) 117. Results are written back over result or writeback bus 120.

Figure 3:
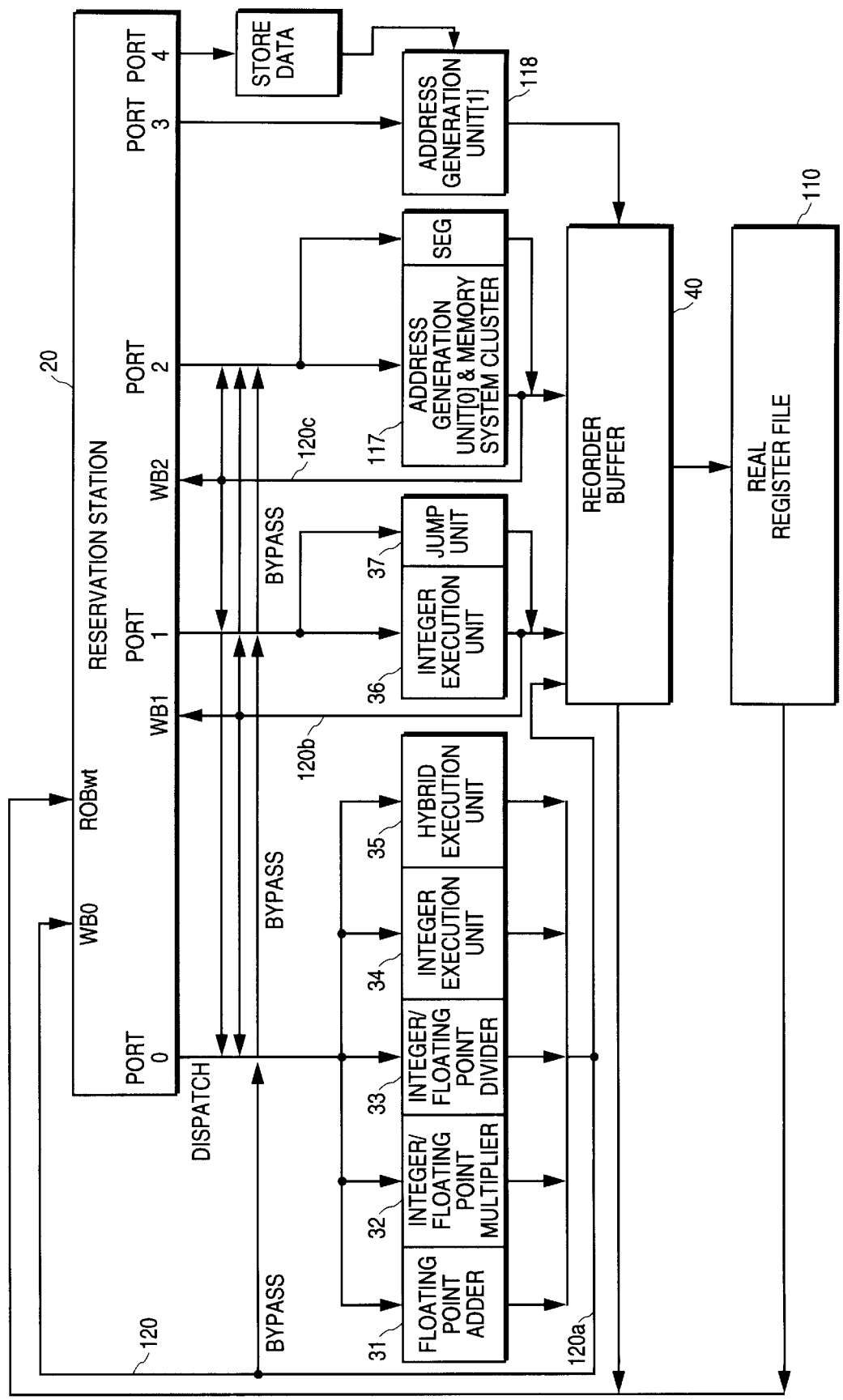
FIG. 3 illustrates a more detailed block diagram of the out-of-order core of a microprocessor incorporating one embodiment of the present invention.

FIG. 3 illustrates a more detailed portion of the microprocessor incorporating the present invention. The microprocessor implementing one embodiment of the present invention may perform out-of-order execution of instructions. The portion of the microprocessor illustrated in FIG. 3 can be considered the out-of-order core of the microprocessor. The first element of the out-of-order core illustrated in FIG. 3 is the reservation station 20. The reservation station 20 is an SRAM register file in front of the functional units that buffers micro operations that are waiting for needed resources in order to execute. These needed resources include the source data operands (that previous micro operations may not yet have created) and a functional unit with which to execute the micro operation.

The reservation station performs several functions. Its data fields serve as a temporary buffer for instructions and the source data that is or will be available. The reservation station maintains waiting instructions and is "watching" all the result/writeback buses from all the execution interfaces "looking" for source data that it needs for its micro operations. When the watched-for data arrives on the result bus 120, the reservation station writes it into the appropriate source data field or fields.

Once all the source operands for a micro operation are in the reservation station, the reservation station determines when an appropriate execution unit is available and schedules the data-ready micro operation for dispatch.

The reservation station 20 of FIG. 3 is illustrated having five dispatch ports. Functional micro operations in the embodiment illustrated will be dispatched over either Dispatch Port 0 or Dispatch Port 1. Memory operations will be dispatched through Dispatch Ports 2–4. In one embodiment of the microprocessor, there are five execution units coupled to Dispatch Port 0 from reservation station 20. These are the floating point add unit 31, the multiply unit 32 for performing integer and floating point multiplies, integer and floating point divide unit 33, integer execution unit 34, and a wire unit 35 which is a hybrid execution unit, as described below. Micro operations, when they are dispatched from the reservation station, are operated on by the various execution units.

Most applications heavily utilize the integer execution unit. Integer execution unit 34 is designed to be able to process data-ready micro operations in one clock cycle. It is therefore referred to as a single-cycle functional unit. In one embodiment, the integer execution unit 34 receives data having a width of 32 bits. The floating point execution units 31, 32 and 33 carry out more complicated tasks when they receive data-ready micro operations. These functional units receive input streams having a width for 86 bits of source data. There is also a wire unit 35 which is a hybrid execution unit implemented in one embodiment for various other instructions. It is similar to a floating point unit in that its input stream takes source data that is 86 bits wide, but it is more like an integer execution unit in that it performs its operations in a single clock cycle.

Dispatch Port 1 from reservation station 20 also has two execution units coupled to it. There is an integer execution unit 36 and a jump unit 37. The integer execution unit 36 may be identical to the execution unit 34, or it may have additional or different functionality. Two integer execution units are provided because of the high volume of integer micro operations common in most code, thereby enhancing performance of the overall system. Of course, alternative microprocessors may incorporate more or fewer execution units depending upon design objectives.

After an execution unit executes a micro operation, it writes back the result to the reorder buffer 40 over writeback bus 120a or 120b. The reorder buffer 40 serves as the place where the results of out-of-order operations are collected so that they can later be committed to machine state in strict von Neumann order, the committed state registers being in the RRF 110. Thus, the reorder buffer is where the out-of-order core reassembles the instruction stream into its program order, before commitment to state registers. At the same time that execution units writeback to the reorder buffer 40, they may simultaneously writeback to the reservation station 20. It may be that the result of an execution unit's operation provides a source operand needed for the execution of another microprocessor, or several other micro operations waiting in the reservation station. Similarly, a result from one execution unit may be immediately bypassed to another, or the same, execution unit if a dependent instruction has already been dispatched.

Coupled to the reservation station through Dispatch Ports 2, 3 and 4 are the memory system execution units. The address generation unit (AGU) [0] and memory system cluster 117 calculates memory addresses for loads and processes them in the manner to be described more fully below. The load result is then provided to the ROB 40 and to the reservation station 20 through writeback path 120c. Similarly, stores are propagated through Dispatch Ports 3 and 4 of the reservation station 20. The AGU[1] unit 118 calculates store addresses and propagates them through the memory system to be described below.

Figures 4A, 4B:
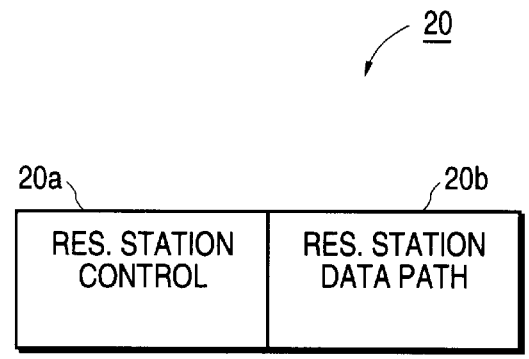
FIGS. 4(a) and 4(b) illustrate the physical arrangement of the reservation station of a microprocessor incorporating one embodiment of the present invention.

In accordance with the present invention, the reservation station 20 of the above described microprocessor is a multiple entry SRAM register array. As can be seen from FIG. 4(a), the reservation station register array may be divided into a reservation station control section 20a and a reservation station data path 20b. The multi-port register in accordance with the present invention concerns the reservation station data path 20b of the reservation station 20. FIG. 4(b) illustrates that in accordance with one embodiment of the present invention, the data path 20b comprises N entries of n bits. The present invention optimizes the register array configuration by interleaving the source one (S1) and source two (S2) bits across each entry. Thus, for entry one, the bit cells for bit[0] of source one and source two are interleaved followed by interleaved bits for bit[1] of source one and source two. As will be described below, this provides for an enhanced multi-port register array.

Figure 5:
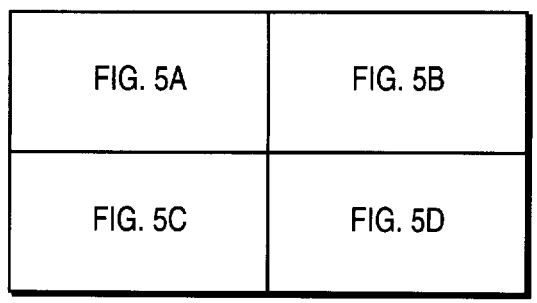
FIGS. 5, 5(a), 5(b), 5(c) and 5(d) illustrate a circuit for implementing one interleaved pair of SRAM cells for the reservation station in accordance with embodiment of the present invention.

Referring now to FIGS. 5 and 5(a)–5(d), one pair of interleaved SRAM storage cells of the reservation station register file will be described. As can be seen, FIG. 5 is an assembly of sub-FIGS. 5(a), 5(b), 5(c) and 5(d). Reference to elements within these sub-figures will be made. The illustration shows two SRAM cells for an arbitrary bit, bit[x], of source one and source two and how they are interleaved within the register file array. A first storage cell 101 (FIG. 5(c)) stores the bit value for the source one (S1) bit[x]. A second storage cell 102 (FIG. 5 (d)) is for storing the bit value for the source two (S2) bit[x]. In one embodiment of the present invention, the storage cell 101 consists of dual cross-coupled complementary metal oxide semiconductor (CMOS) inverters 103 and 104. The storage cell 102 consists of dual cross-coupled CMOS inverters 105 and 106.

Figure 5A:
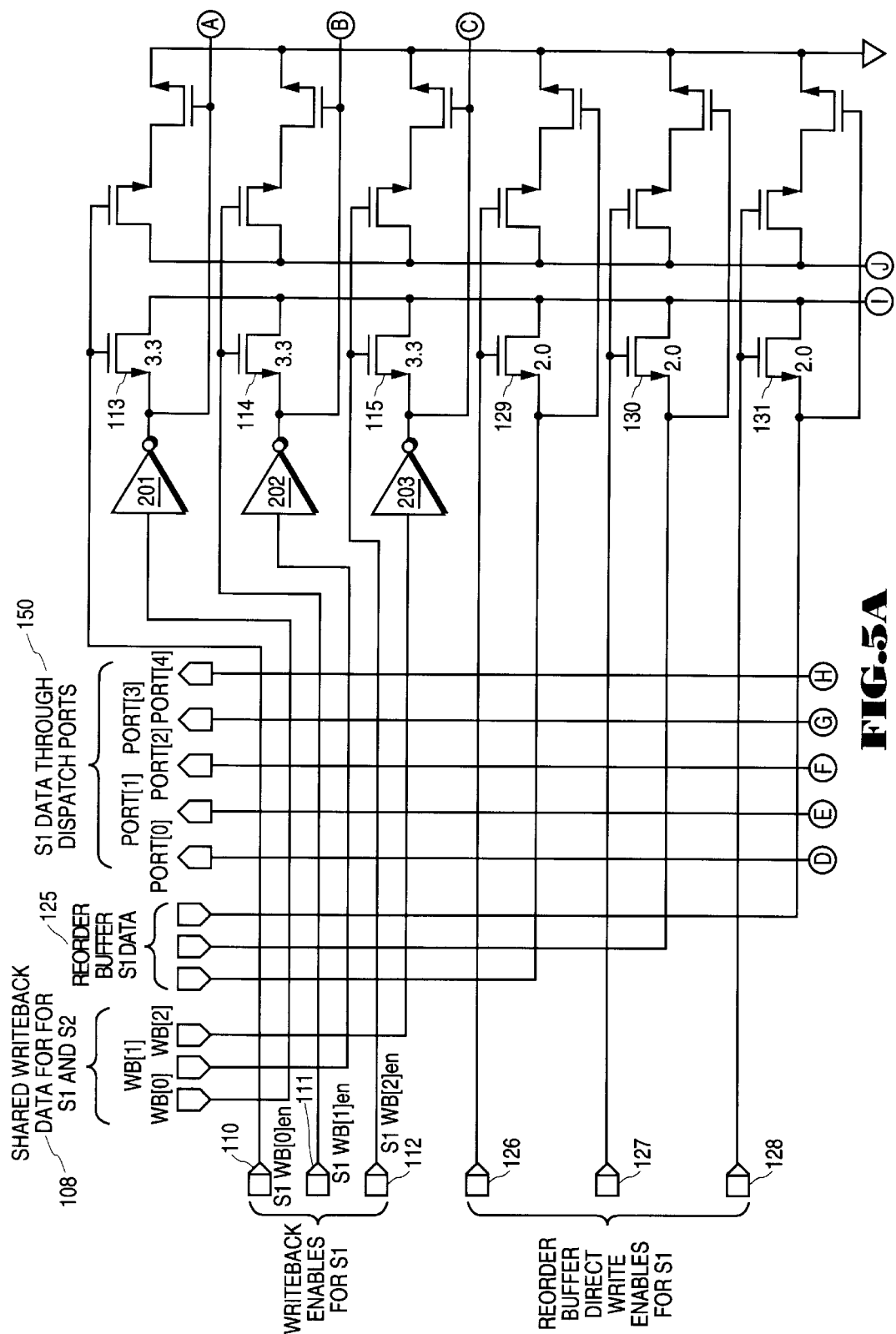
Figure 5B:
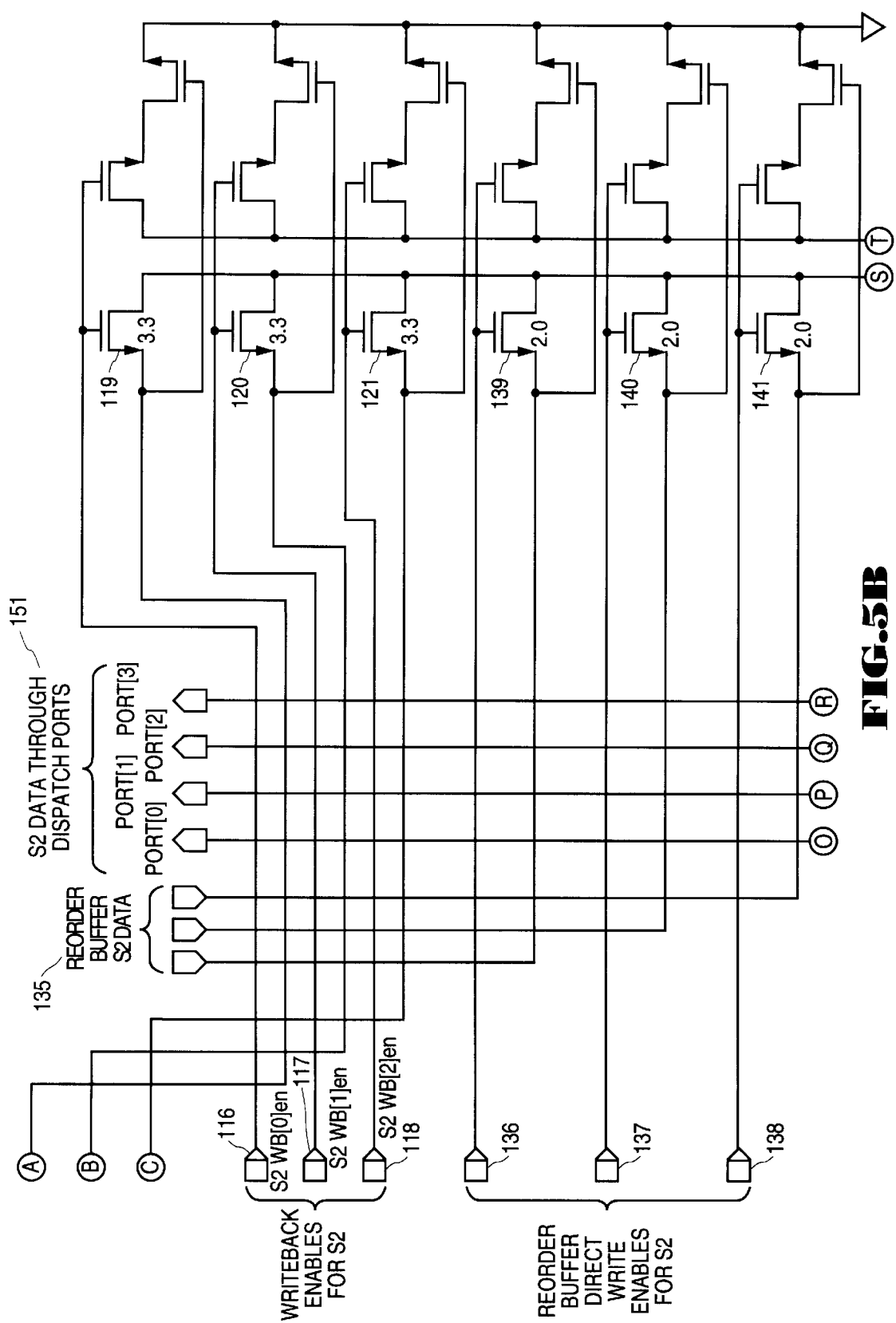
Figure 5C:
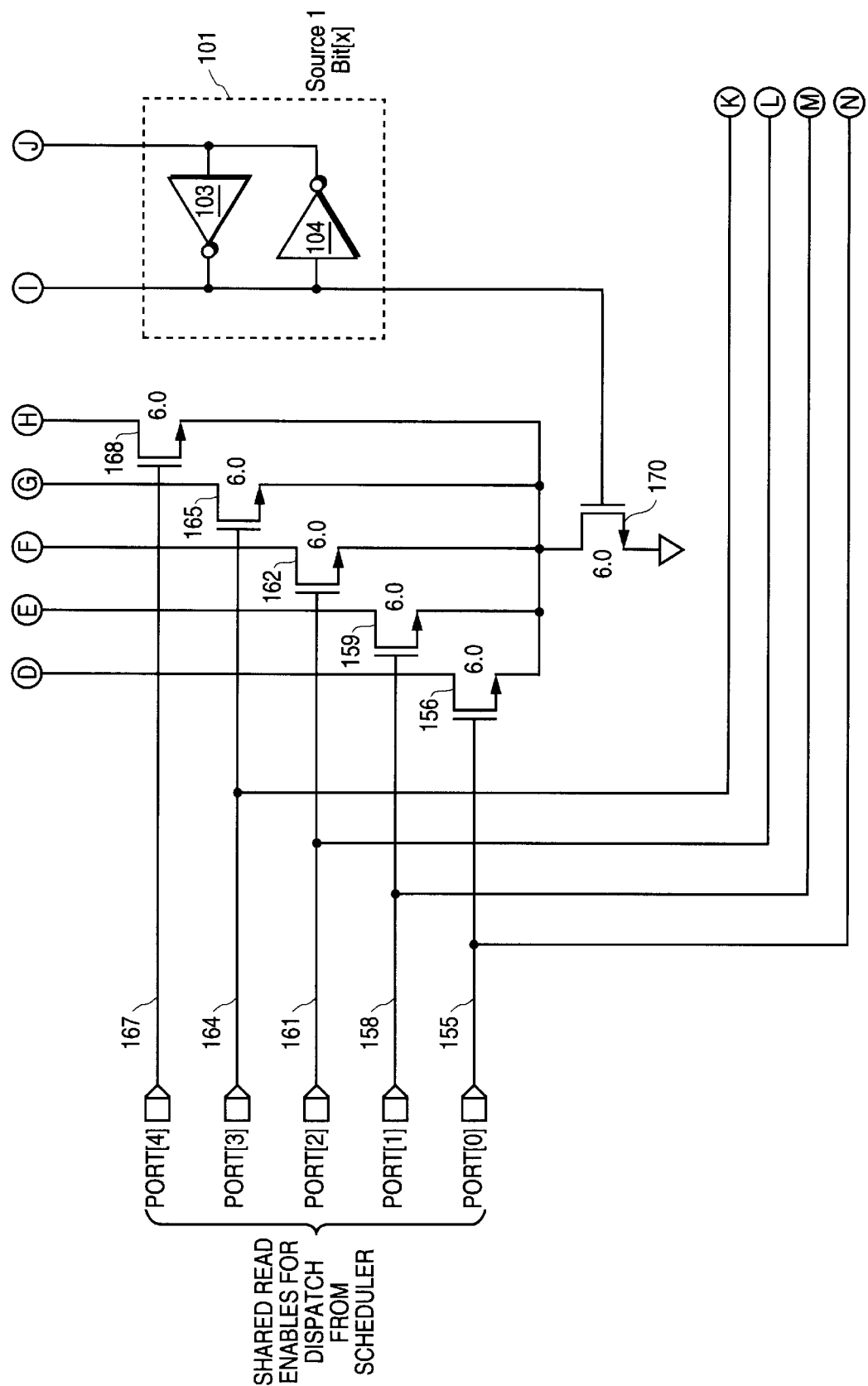
Figure 5D:
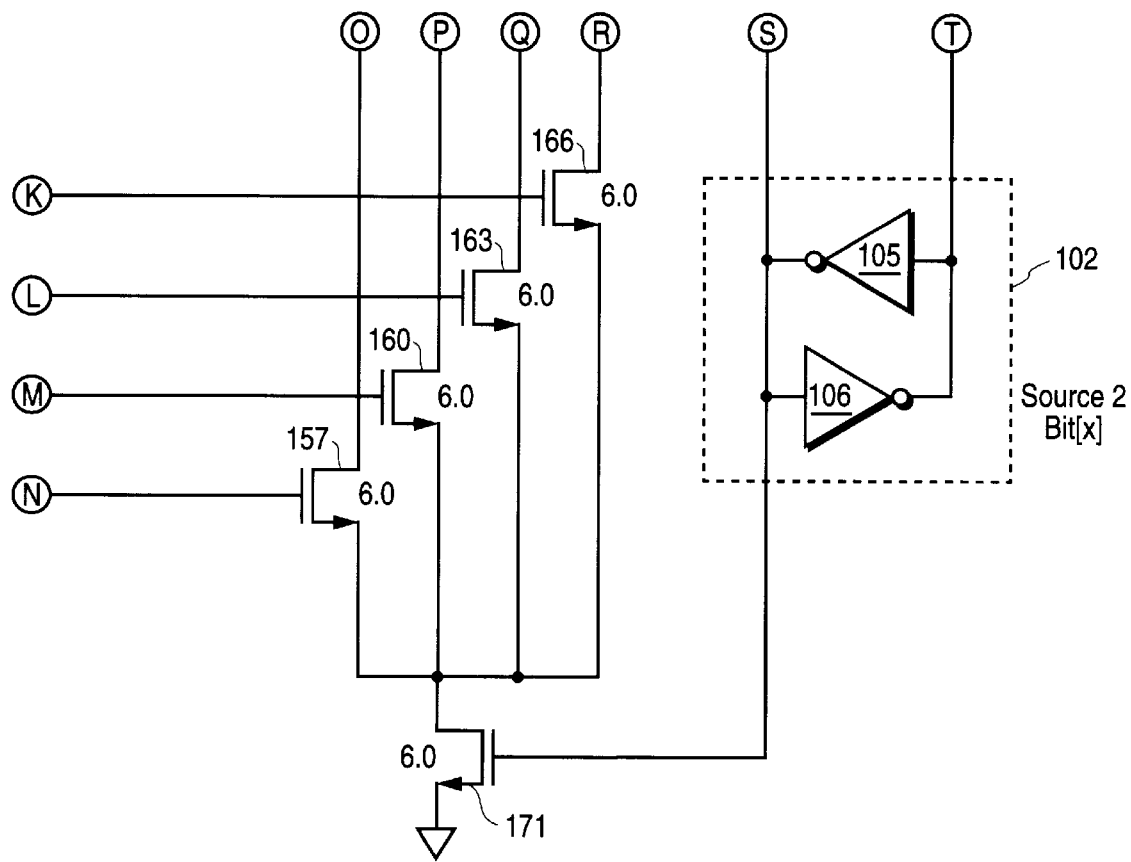

For use as a reservation station register file, the multiple port storage cells 101 (FIG. 5(c)) and 102 (FIG. 5(d)) of the present invention contain at least one read port and write port. In the described reservation station, the SRAM cells are exclusively read. Therefore, the multi-port cells of the reservation station may implement a reduced sized sampling transistor for the read ports because an entry in the reservation station will only be dispatched to a single functional unit for execution. Hence, when reading, only one bit line is pulled at a time. However, the storage cells 101 and 102, and each of the other interleaved pairs of storage cells within the reservation station register file, may be written to from multiple sources and hence are provided with multiple write ports. For each write port, the multi-port cell contains a write enable line, a write data line, and a write transistor stack. The function of the write transistor stack is described in the above-noted patent application incorporated by reference, now abandoned, entitled "A Multi-Port Register".

The six write ports 108 and 125, illustrated in FIG. 5(a) are provided for the interleaved storage cells 101 and 102 and reflect the fact that in the illustrated microprocessor architecture, data may be written into the reservation station through three different writeback ports, WB[0], WB[1] and WB[2]. Further, the reorder buffer 40, ROB, may provide up to three source operands to the reservation station simultaneously. Data from the writeback ports may be destined for either a source one operand or a source two operand or both source operands. Thus, FIG. 5, and more specifically FIG. 5(a) illustrates that the writeback data for S1 and S2 comes in through shared data lines 108 which correspond to writeback data received through writeback ports WB[0], WB[1] and WB[2].

When bit[x] of writeback data from one of the writeback ports is a source one bit to be stored in storage cell 101, one of the writeback enables 110, 111 or 112 (FIG. 5(a)) is set active, corresponding to the one of the three writeback ports through which the data will be arriving. An active signal on S1 writeback enable 110 activates writeback enable transistor 113. S1 writeback enable 111 activates writeback enable transistor 114. S1 writeback enable 112 activates the writeback enable transistor 115. This provides a path for the writeback data bit to be supplied to the storage cell 101.

If the writeback data from one of the writeback ports for bit[x] is destined for storage cell 102, one of the three writeback enables for S2 bit[x] 116, 117 or 118 (FIG. 5) is activated corresponding to the writeback port on which the data will be arriving. S2 writeback enable 116 activates writeback enable transistor 119. S2 writeback enable 117 activates writeback enable transistor 120. S2 writeback enable 118 activates writeback enable transistor 121. This provides a path for the writeback data on the corresponding port to be written into the source two bit[x] storage cell 102. In the illustrated embodiment, writeback enable transistors 113, 114, 115, 119, 120 and 121 are each N-channel metal oxide semiconductor (NMOS) transistors. A relative size is indicated in the figure.

As was described above, the reorder buffer 40 may write up to three source operands at a time to the reservation station. Data to be written to S1 storage cell 101 may come through any one of the three ROB S1 data lines illustrated as ROB S1 data lines 125. For storage cell 101, there are provided three ROB direct write enable lines for S1, enable lines 126, 127 and 128 (FIG. 5(a)). These enable lines provide an activating signal to NMOS write enable transistors 129, 130 and 131, respectively, to correspond to the ROB S1 data path being used to write to the storage cell 101.

For writing data to S2 bit[x] storage cell 102, FIG. 5(b) illustrates the three write ports provided for ROB S2 data lines 135. Three ROB direct write enables for S2 are provided, write enable line 136, 137 and 138. These enable lines respectively activate NMOS write enable transistors 139, 140 and 141 for writing data from the corresponding S2 ROB data lines 135 to the storage cell 102.

The writeback data lines 108 for source one and source two, as was described above, are shared by both of the interleaved cells 101 and 102 because writeback data can be destined for either a source one entry or a source two entry, or both. Further, data being written back to the reservation station 20 may be targeted for sources in multiple entries in the reservation station. When the shared writeback data lines are associatively writing to multiple entries and multiple sources, large SRAM capacitances can be introduced which are difficult to overcome by the driving circuitry for the writeback data lines. To isolate the SRAM capacitances to improve writeback driving to the array, each interleaved SRAM pair is provided with a mechanism for isolating the SRAM capacitances. Thus, inverter circuit 201 (FIG. 5(a)) is provided on the writeback data line path from writeback port[0]. Inverter 202 is provided in the shared writeback data line path from writeback port[1]. Inverter 203 is provided in the shared writeback data line path from writeback port[2].

The inverters introduced in the shared writeback data line paths prevent the capacitances introduced by writing multiple entries from reflecting back to the data line which then would need to be overcome by the writeback drivers. In the illustrated embodiment, the capacitance isolation inverters are not provided for the ROB S1 data lines 125 (FIG. 5(a)) or the ROB S2 data lines 135 (FIG. 5(b)), because, in accordance with the illustrated embodiment of the present invention microprocessor, the ROB will only be writing one entry from a given data line at a time. Of course, in an alternative embodiment, all the data lines can be provided with the capacitance isolation mechanism.

The multi-port storage cells 101 and 102 each provide a reduced size sampling transistor for their respective read ports. As explained, in accordance with the implemented embodiment of the present invention, read operations from a reservation station entry are exclusive because entries will only be dispatched to one functional unit for execution. It is conceivable, that in alternative embodiments of the present invention, reservation station entries could be dispatched to multiple functional units wherein they remained buffered until the first functional unit able to executes the instruction. Accordingly, the teachings of the present invention are not limited to a single sampling transistor coupled to the read ports for the storage cells 101 and 102.

When an entry in the reservation station is dispatched to a functional unit, both source one and source two bits of the entry are provided to the functional unit. Thus, the read enable lines associated with each bit[x] of an entry are shared by the source one and source two bits. The enable lines are controlled by a scheduler which triggers the dispatch of entries from the reservation station to a functional unit when all data dependencies are resolved for the entry and a functional unit is available. Thus, read enable line 155 controls read enable NMOS transistors 156 (FIG. 5(c)) and 157 (FIG. 5(d)) for dispatching source one bit[x] and source two bit[x], respectively, through dispatch port[0] to the functional unit(s) associated therewith. Read enable line 158 controls both read enable NMOS transistors 159 (FIG. 5(c)) and 160 (FIG. 5(d)) for dispatching bit[x] of source one and source two through dispatch port[1] to a functional unit associated therewith. Similarly, read enable line 161 controls read enable NMOS transistors 162 and 163 for dispatch through port[2], and shared read enable line 164 activates read enable NMOS transistors 165 and 166 for dispatch through port[3]. The Store Data functional unit receives only one source operand, and by definition, in accordance with the illustrated embodiment, is a source one entry in the reservation station 20. Accordingly, read enable line 167 only controls read enable NMOS transistor 168 (FIG. 5(c)) for dispatching source one through dispatch port[4]. In the illustrated embodiment, that read enable is not shared with source two because source two is not provided to the functional unit associated with dispatch port[4]. The S1 data is provided through dispatch ports 150 (FIG. 5(a)), and the S2 data is dispatched through the four dispatch lines illustrated as dispatch lines 151 (FIG. 5(b)).

Because in the illustrated embodiment of the present invention, entries in the reservation station are only dispatched through a single read port at any one time, the sampling NMOS transistors 170 (FIG. 5(c)) and 171 (FIG. 5(d)), respectively, associated with source one bit[x] and source two bit[x] may be sized in proportion to the enable transistors. The determination of such ratios is known in the art. This is possible because the entries are not propagated through multiple read ports. That is, activation of transistors 156, 159, 162, 165 and 168 are mutually exclusive and activation of transistors 157, 160, 165 and 166 are mutually exclusive. This minimizes the power consumed by reading entries from the storage cells 101 and 102 and reduces the layout area required.

Another power reducing feature of the present invention concerns the arrangement through which the sampling transistors are coupled to the storage cells 101 and 102. They are arranged in such a way as to show a bit line polarity preference to read data of "0", or a low power state. This reduces the number of times the bit lines need to be pre-charged which is necessary after reading high data states from the storage cells.

Figure 6:
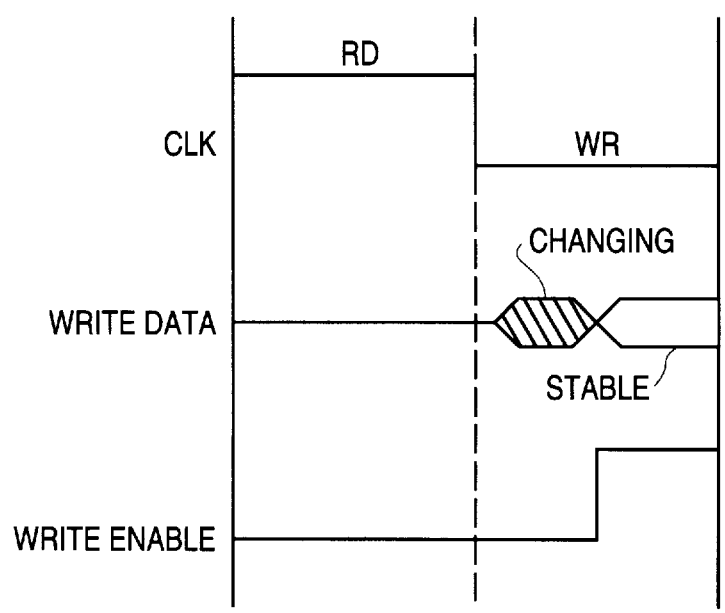
FIG. 6 illustrates a timing diagram for illustrating a power savings feature in accordance with one aspect of the present invention.

Referring now to FIG. 6, a timing diagram is illustrated for exhibiting another power saving feature in accordance with one aspect of the present invention. The timing diagram shows a clock signal which corresponds to the read and write phases of a clock cycle for the reservation station in accordance with the present invention. Writing is performed during the second phase of the clock cycle. The present invention recognizes that during the write phase, a predetermined amount of time is necessary for settling of the data line value before it can be written to the storage cells of 101 and 102. In accordance with the present invention, the write enable lines are not asserted until a predetermined period of time after the start of the write phase. In one embodiment, the write enable lines are asserted after a settling point for the data line. Alternatively, the write enable lines may be asserted at approximately the same time as the settling point of the data line. This prevents data from being latched until it is stable and reduces the overall power consumption of the reservation station, and in turn the entire microprocessor.

There has thus been described a multi-port register cell array configuration suitable for use in a reservation station in a superscalar microprocessor. Although the present invention has been described in terms of illustrated and implemented embodiments, those of ordinary skill in the art will appreciate that various alterations and modifications might be made for using the multi-port register in other applications where the advantages and features of the array are desirable. Accordingly, the scope of the present invention should be determined in terms of the claims which follow.

What is claimed is:

1. A computer system comprising:
    an input/output (I/O) means for providing a communications interface;
    a memory means coupled to communicate with said I/O means for storing instructions and computer data;
    data input means coupled to said I/O means for providing data input and data output to interface with a computer user; and
    microprocessor means coupled to communicate with said I/O means and said memory means for executing instructions and processing computer data, said microprocessor means including a reservation station comprising a register file for storing N entries of a first n-bit data word and a second n-bit data word, said register file comprising:
    a plurality of first storage cells for storing bits 1 to n of each of said N entries of said first N-bit data word;
    a plurality of second storage cells for storing bits 1 to n of each of said N entries of said second N-bit data word, wherein said second storage cells are interleaved with said first storage cells across each of said N entries to form n storage cell pairs;
    a plurality of shared write data lines coupled to said first and second pluralities of storage cells, wherein multiple storage cells are part of said register file; and
    a means for reducing capacitance associated with said plurality of shared write data lines, said means for reducing capacitance comprising a capacitance isolation mechanism for isolating capacitances generated when associatively writing to multiple storage cells in said computer system.

2. The computer system of claim 1 wherein said capacitance isolation mechanism comprises a plurality of inverter circuits, coupled to said plurality of shared write data lines.

3. The computer system of claim 2 further comprising a plurality of shared read enable lines, wherein a storage cell pair is read by activating one of said plurality of shared read enable lines.

4. The computer system of claim 3 wherein each storage cell includes a reduced-size sampling transistor.

5. A computer system including a communications interface, a memory, a user interface, and a processor, the processor coupled to the communications interface and the memory, the processor including a reservation station including a register file, the register file comprising:
    a plurality of first storage cells;
    a plurality of second storage cells, the plurality of second storage cells interleaved with the plurality of first storage cells to form a plurality of storage cell pairs; and
    a plurality of shared write data lines coupled to the plurality of first storage cells and the plurality of second storage cells, and
    a means for reducing capacitance associated with said plurality of shared write data lines, said means for reducing capacitance comprising a capacitance isolator for isolating capacitances generated when associatively writing to multiple storage cells in said register file.

6. The computer system of claim 5, wherein the capacitance isolator comprises a plurality of inverter circuits coupled to the plurality of shared write data lines.

7. The computer system of claim 5, further comprising a plurality of shared read enable lines wherein the plurality of storage cell pairs is read by activating one of the plurality of shared read enable lines.

8. The computer system of claim 5, wherein each storage cell includes a reduced-size sampling transistor.

9. The computer system of claim 5, wherein each of the storage cells comprises dual cross-coupled inverters.

10. The computer system of claim 5, further comprising a second plurality of write data lines coupled to the plurality of storage cells.

11. A register file for storing N entries of first and second n-bit data words, comprising:

a plurality of first storage cells for storing bits 1 to n of each of said N entries of said first N-bit data word;

a plurality of second storage cells for storing bits 1 to n of each of said N entries of said second N-bit data word, wherein said second storage cells are interleaved with said first storage cells across each of said N entries to form n storage cell pairs;

a plurality of shared write data lines coupled to said first and second pluralities of storage cells, wherein multiple storage cells are part of said register file; and a capacitance isolation mechanism associated with said plurality of shared write data lines for isolating capacitances generated when associatively writing to multiple storage cells in said register file.

12. The register file of claim 11, wherein said capacitance isolation mechanism comprises a plurality of inverter circuits, coupled to said plurality of shared write data lines.

13. The register file of claim 12, further comprising a plurality of shared read enable lines, wherein said storage cell pairs are read by activating one of said plurality of shared read enable lines.

14. The register file of claim 13, wherein each storage cell includes a reduced-size sampling transistor.

15. The register file of claim 13, wherein each of said storage cells comprises dual cross-coupled inverters.

16. The register file of claim 13, further comprising a second plurality of write data lines coupled to said plurality of storage cells.

* * * * *